(No Model.)
V. T. LYNCH.
LINK FOR CABLE GRIPS.
No. 448,973. Patented Mar. 24, 1891.
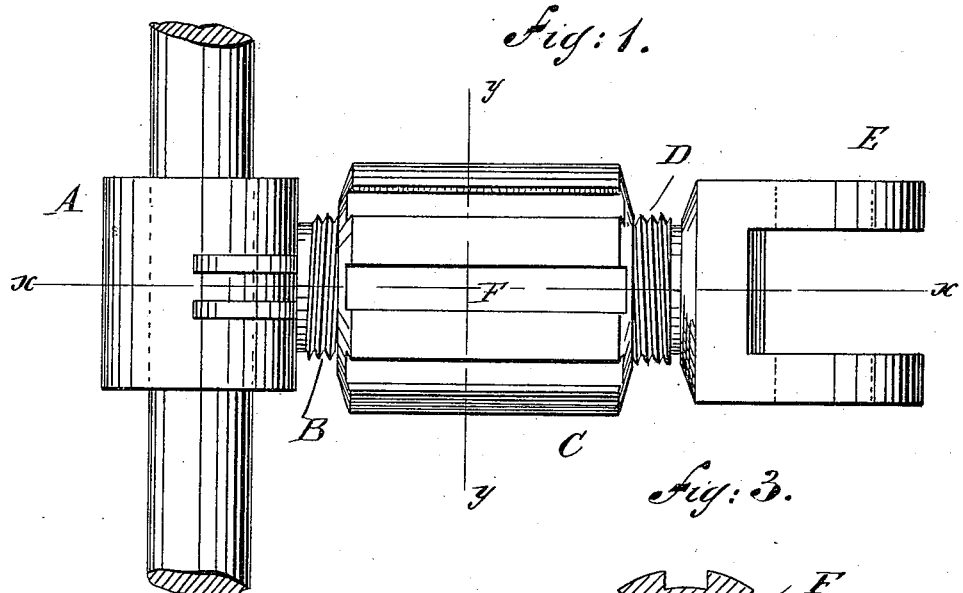
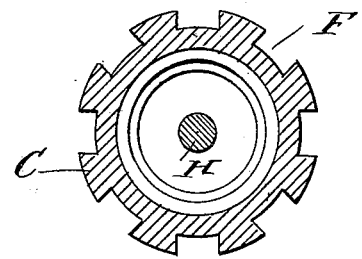
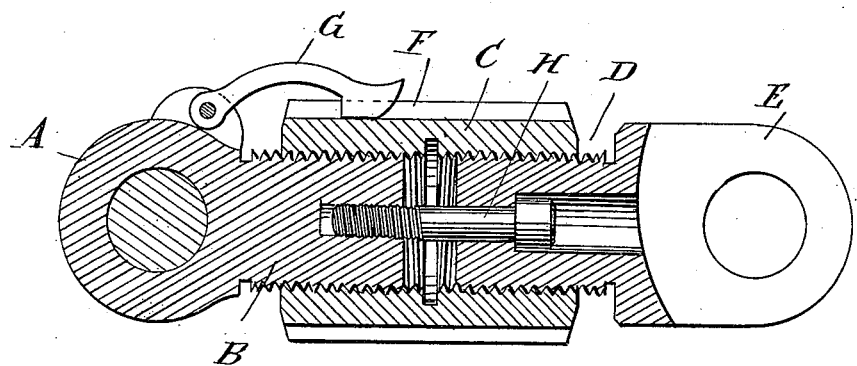
WITNESSES:
Chas. Nida.
C. Sedgwick
INVENTOR:
V. T. Lynch
BY Munn & Co.
ATTORNEYS

UNITED STATES PATENT OFFICE.

VERNON T. LYNCH, OF CHICAGO, ILLINOIS.

LINK FOR CABLE-GRIPS.

SPECIFICATION forming part of Letters Patent No. 448,973, dated March 24, 1891.

Application filed August 8, 1890. Serial No. 361,436. (No model.)

*To all whom it may concern:*

Be it known that I, VERNON T. LYNCH, of Chicago, in the county of Cook and State of Illinois, have invented a new and Improved Link for Cable-Grips, of which the following is a full, clear, and exact description.

The object of the invention is to provide a new and improved link especially designed for use on cable-grips, and which is simple and durable in construction and can be readily extended or shortened, as desired.

The invention consists of a cross-head provided with a thread, a clevis also provided with a thread, and a nut adapted to engage the said two threads and also adapted to be locked in place when the cross-head and clevis are adjusted.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of the improvement. Fig. 2 is a sectional plan view of the same on the line $xx$ of Fig. 1, and Fig. 3 is a transverse section of the same on the line $yy$ of Fig. 1.

The improved link for cable-grips is provided with a cross-head A, on which is formed a right-hand thread B, adapted to be engaged by one end of a nut C, also adapted to engage with its other end a screw-thread D, formed on the clevis E. The nut C is consequently provided with right and left hand threads, so that when the said nut is turned on the threads B and D, the cross-head A and the clevis E are moved toward or from each other, according to the direction in which the said nut is turned.

In order to lock the nut C in place when the link is adjusted to the desired length, it is provided on its exterior with longitudinally-extending grooves F, adapted to be engaged, one at a time, by the free end of a pawl G, fulcrumed on either the cross-head A or the clevis E.

In order to limit the movement of the cross-head A and the clevis E, a bolt H is provided, which passes loosely through the threaded shaft of the clevis E and screws into the threaded shaft of the cross-head, as is plainly shown in Fig. 2.

In order to lengthen the link it is necessary to first unscrew the bolt H a suitable distance, then the pawl G is thrown out of contact with the respective groove F in the nut C, and then the latter is turned so that the cross-head and the clevis move apart until the desired length is reached. The pawl G is then thrown into contact again with the respective groove in the nut C and the bolt H is screwed down. The link can be shortened in a similar manner, the nut C being turned in an opposite direction.

Having thus fully described my invention, I claim as new and desire to secure by Letters Patent—

1. A link for cable-grips, comprising a cross-head provided with a thread, a clevis also provided with a thread, and a nut engaging the two threads, and the internal longitudinally-extending bolt connnecting said two screw-threaded portions, substantially as shown and described.

2. The herein-described link, comprising the cross-head A, having externally-threaded portion B and a threaded bore, the clevis E, having a central bore in two diameters and the externally-threaded portion D, the bolt H, passing through the clevis-bore into the internal threaded bore of section A, the head of the bolt engaging the shoulder formed by the two diameters, the nut screwed on the parts B E, and a lock for said nut, substantially as set forth.

3. In a link for cable-grips, the combination, with a cross-head provided with a thread, of a clevis provided with a thread running in the opposite direction to the thread on the said cross-head, a nut provided with two threads running in opposite directions and adapted to screw on the said two threads of the cross-head and clevis, and a pawl fulcrumed on the said cross-head and engaging with its free end one of a series of longitudinal grooves formed in the said nut, substantially as shown and described.

4. In a link for cable-grips, the combination, with a cross-head provided with a thread, of a clevis provided with a thread running in the opposite direction to the thread on the said cross-head, a nut provided with two threads running in opposite directions and
5 adapted to screw on the said two threads of the cross-head and clevis, a pawl fulcrumed on the said cross-head and engaging with its free end one of a series of longitudinal grooves formed in the said nut, and a bolt connecting the cross-head and clevis, substantially as 10 shown and described.

VERNON T. LYNCH.

Witnesses:
   HENRY GOORIS,
   F. GOORIS.